US010281960B2

(12) United States Patent
Liu et al.

(10) Patent No.: US 10,281,960 B2
(45) Date of Patent: May 7, 2019

(54) TOOL-AND-FASTENER-FREE COMPUTER CHASSIS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Yue Liu, Wuhan (CN); Shuan-Ping Yan, Wuhan (CN); Ling-Xin Zeng, Wuhan (CN); Xiao-Zhong Jing, Wuhan (CN); Yi-Sheng Lin, New Taipei (TW); Chung Chai, New Taipei (TW); Liang-Chin Wang, New Taipei (TW)

(73) Assignees: HONGFUJIN PRECISION INDUSTRY (WUHAN) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/718,807

(22) Filed: Sep. 28, 2017

(65) Prior Publication Data
US 2018/0329463 A1    Nov. 15, 2018

(30) Foreign Application Priority Data

May 10, 2017   (CN) .......................... 2017 1 0326423

(51) Int. Cl.
*G06F 1/18* (2006.01)

(52) U.S. Cl.
CPC .............. *G06F 1/182* (2013.01); *G06F 1/184* (2013.01)

(58) Field of Classification Search
None
See application file for complete search history.

(56) References Cited

U.S. PATENT DOCUMENTS

| 5,680,536 A * | 10/1997 | Tyuluman | G06F 1/184 714/1 |
| 5,761,459 A * | 6/1998 | Schnoor | H05K 1/14 710/305 |
| 5,907,475 A * | 5/1999 | Babinski | H05K 7/209 361/719 |
| 6,525,926 B1 * | 2/2003 | Chen | G06F 1/181 312/223.2 |
| 2007/0152694 A1 * | 7/2007 | Yin | G01R 31/2806 324/757.02 |
| 2008/0037209 A1 * | 2/2008 | Niazi | G06F 1/181 361/727 |

(Continued)

*Primary Examiner* — Binh B Tran
*Assistant Examiner* — Douglas R Burtner
(74) *Attorney, Agent, or Firm* — ScienBiziP, P.C.

(57) ABSTRACT

A computer chassis capable of receiving multiple motherboards includes a shell and a first motherboard received in the shell. The shell includes a plurality of grooves and a pressing column. The computer chassis further includes a motherboard module, the motherboard module includes a bracket and a second motherboard received in the bracket. The bracket includes an operation member and a plurality of guide rails. The guide rails are inserted into the grooves, the operation member is rotated to drive the bracket to the first motherboard, until the motherboard module is slidably rotated in the shell. The second motherboard is thereby electrically connected with the first motherboard.

17 Claims, 6 Drawing Sheets

(56) References Cited

U.S. PATENT DOCUMENTS

| | | | | |
|---|---|---|---|---|
| 2008/0037214 A1* | 2/2008 | Niazi | .................... | G06F 1/20 |
| | | | | 361/679.3 |
| 2009/0190297 A1* | 7/2009 | Feldman | ................ | G06F 1/185 |
| | | | | 361/679.32 |
| 2010/0027214 A1* | 2/2010 | Wu | .................... | G06F 1/184 |
| | | | | 361/679.47 |
| 2010/0195304 A1* | 8/2010 | Takao | ................ | G06F 1/1616 |
| | | | | 361/804 |
| 2011/0320667 A1* | 12/2011 | Chiu | ................ | G06F 1/185 |
| | | | | 710/301 |
| 2012/0215956 A1* | 8/2012 | Zeng | ................ | G06F 1/184 |
| | | | | 710/301 |
| 2016/0066468 A1* | 3/2016 | Smith | ................ | H05K 7/208 |
| | | | | 361/679.52 |
| 2017/0123465 A1* | 5/2017 | Casserly | ................ | G06F 1/185 |
| 2017/0202084 A1* | 7/2017 | Wavering | ................ | H05K 1/141 |

\* cited by examiner

US 10,281,960 B2

TOOL-AND-FASTENER-FREE COMPUTER CHASSIS

CROSS-REFERENCE TO RELATED APPLICATIONS

This application claims priority to Chinese Patent Application No. 201710326423.6 filed on May 10, 2017 the contents of which are incorporated by reference herein.

FIELD

The subject matter herein generally relates to computer chassis.

BACKGROUND

To improve computer functions, some manufacturers use a dual-layer motherboard in a computer chassis. However, it is difficult to assemble and disassemble to the dual-layer motherboard within the computer chassis.

BRIEF DESCRIPTION OF THE DRAWINGS

Implementations of the present disclosure will now be described, by way of example only, with reference to the attached figures.

DETAILED DESCRIPTION

Figure 1:
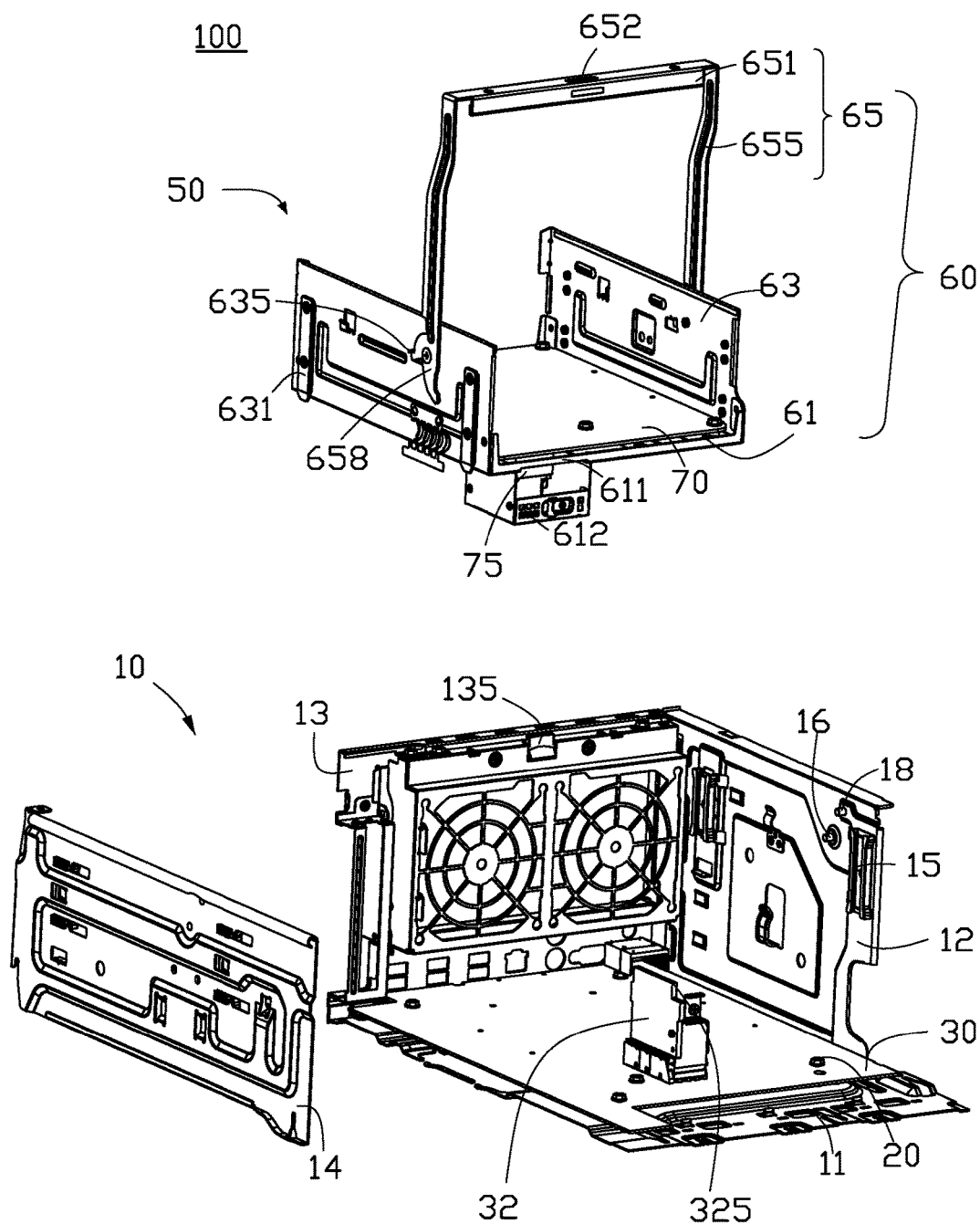
FIG. 1 is an exploded view of one exemplary embodiment of a computer chassis.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates one exemplary embodiment of a computer chassis 100 that includes a shell 10, a first motherboard 30 received in the shell 10, and a motherboard module 50 received in the shell 10. The first motherboard 30 can be electrically connected to the motherboard module 50.

Figure 2:
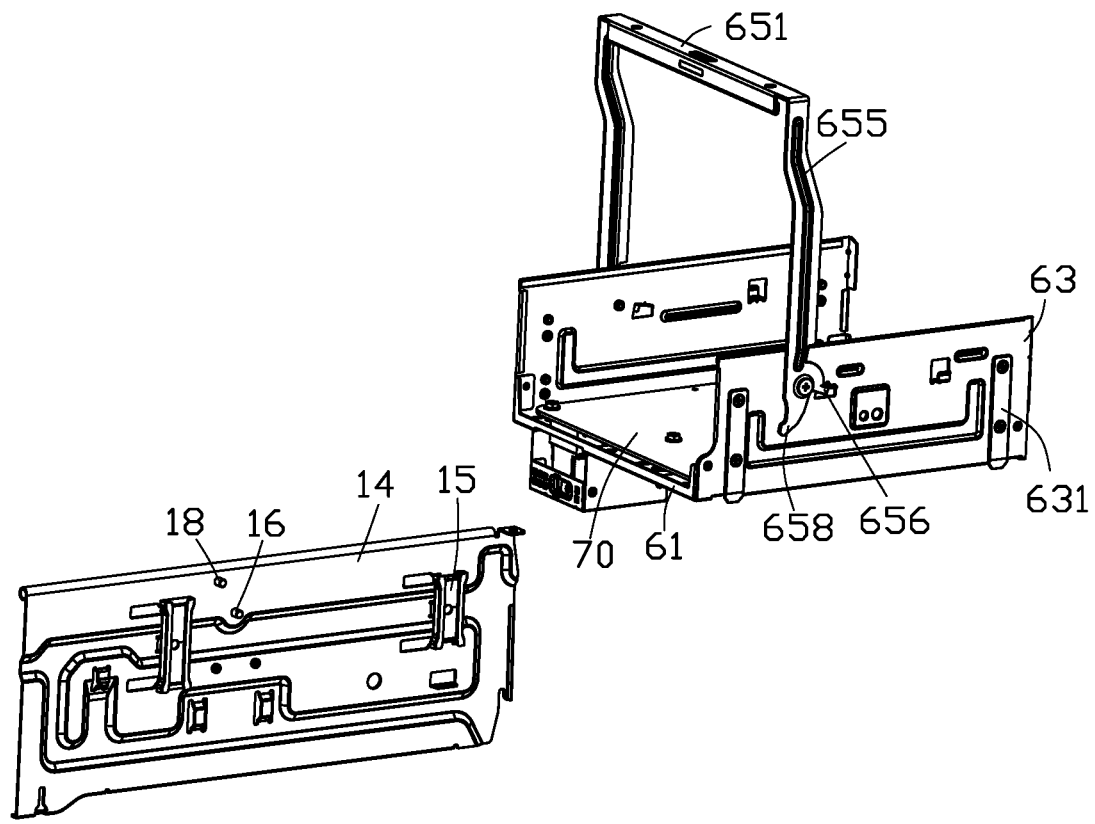
FIG. 2 is and exploded view of a motherboard module and a baffle of the computer chassis of FIG. 1.

FIG. 1 and FIG. 2 illustrate that the shell 10 includes a bottom plate 11, a side plate 12 connected with the bottom plate 11, and a rear plate 13 connected at a rear end of the bottom plate 11. The bottom plate 11 is provided with a plurality of embossments (not shown), and a plurality of fasteners 20 extending through the first motherboard 30 to be inserted into the embossments, to secure the first motherboard 30 on the bottom plate 11. A top end of the rear plate 13 is provided with a latch member 135, the latch member 135 can latch on the motherboard module 50 to secure the motherboard module 50. A baffle 14 is perpendicularly connected to the rear plate 13 and is substantially parallel to the side plate 12. The side plate 12 and the baffle 14 include two vertical grooves 15, and the motherboard module 50 can be inserted into the grooves 15. The side plate 12 and the baffle 14 are respectively provided with a guiding column 16 and a pressing column 18.

The first motherboard 30 includes a plurality of through holes (not explicitly shown). The plurality of fasteners 20 passes through the through holes to be inserted into the embossments to secure the first motherboard 30 on the bottom plate 11. The first motherboard 30 includes a connecting portion 32, and the connecting portion 32 defines a plurality of slots 325. The motherboard module 50 is configured to be inserted into the slots 325.

The motherboard module 50 includes a bracket 60 and a second motherboard 70 secured on the bracket 60. The bracket 60 includes a bottom wall 61, two sidewalls 63 connected with two sides of the bottom wall 61, and an operation member 65 rotatably installed on the two sidewalls 63. The bottom wall 61 defines an opening 611, and a bottom end of the bottom wall 61 is provided with a holder 612. The outer side of each sidewall 63 is provided with a guide rail 631, and each guide rail 631 is configured to be inserted into a corresponding one of the grooves 15. The outer side of each sidewall 63 is also provided with a limiting block 635 for limiting the operation member 65.

The operation member 65 includes an operation pole 651 and two rotating arms 655 connected to the two ends of the operation pole 651. The operation pole 651 is configured to pull on the motherboard module 50. A middle portion of the operation pole 651 includes a locking hole 652, and the latch member 135 is configured to insert into the locking hole 652 to secure the operation pole 651. The end away from the operation pole 651 of each rotating arm 655 is rotatably installed on the outer side of each sidewall 63 to install the operation member 65 on the bracket 60. The end away from the operation pole 651 of each rotating arm 655 includes a stopper portion 656 and guide portion 658. The limiting block 635 is close to the stopper portion 656, and the limiting block 635 prevents the rotating arms 655 from continuing to rotate.

The second motherboard 70 is installed on the bottom wall 61. A bottom end of the second motherboard 70 is provided with a connector 75 configured to electrically connect to the first motherboard 30. The connector 75 passes through the opening 611 and is received in the holder 612.

Figure 3:
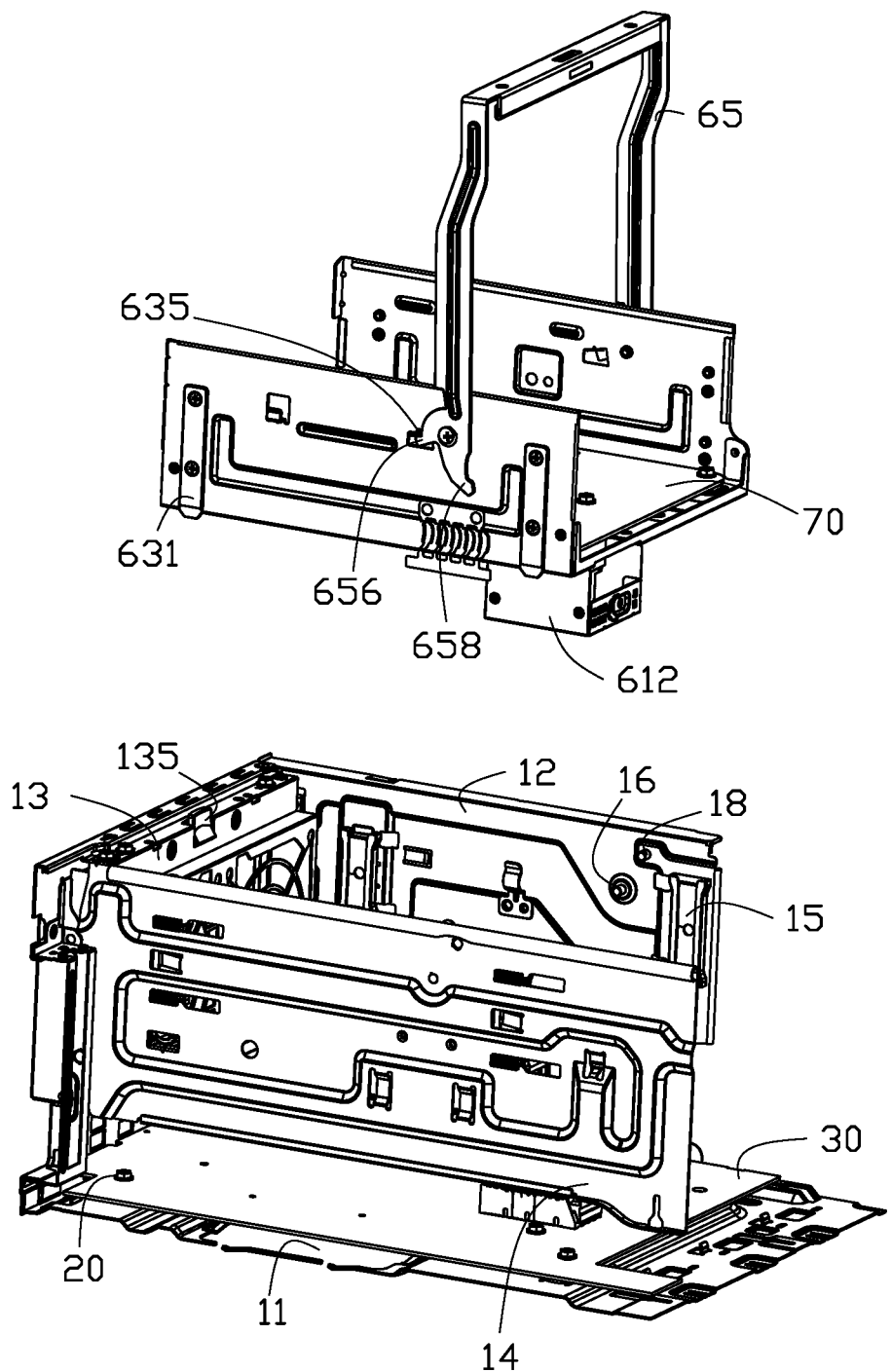
FIG. 3 is an exploded view of the computer chassis in FIG. 1 from a different angle.

FIG. 3 illustrates a partially assembled computer chassis 100. The first motherboard 30 is placed on the bottom plate 11, and the through holes are aligned with the embossments of the bottom plate 11. The fasteners 20 pass through the through holes and are inserted into the embossments to secure the first motherboard 30 on the bottom plate 11. The second motherboard 70 is installed on the bottom wall 61 of the bracket 60, and the connector 75 passes through the opening 611 to be received in the holder 612. The two rotating arms 655 are installed on two sidewalls 63 of the bracket 60. Thereby, the motherboard module 50 is assembled. The operation pole 651 is pulled to rotate the operation member 65 until each stopper portion 656 abuts against each limiting block 635 of the sidewall. At this time, the two rotating arms 655 are substantially perpendicular to the bottom wall 61.

Figure 4:
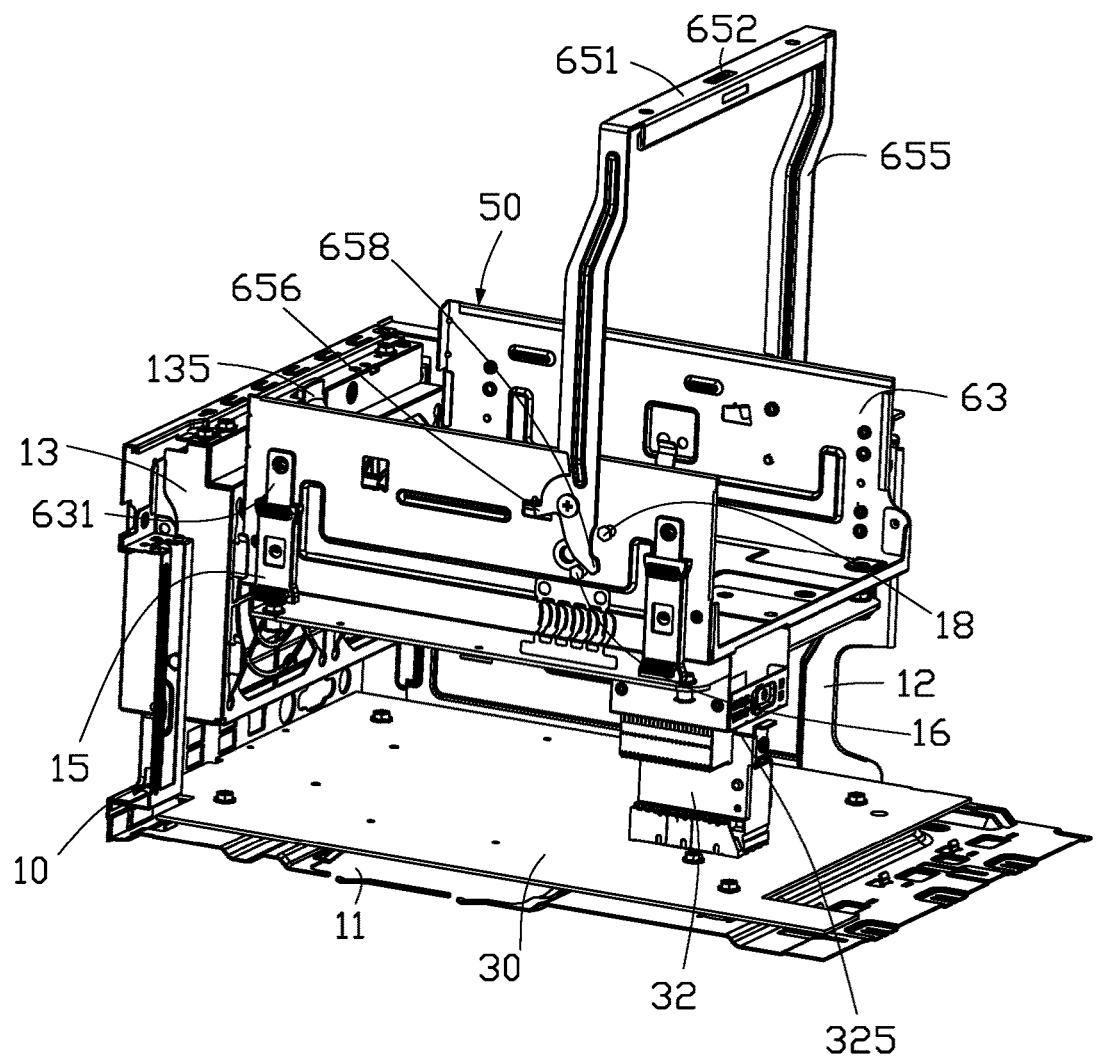
FIG. 4 is a partially assembled view of the computer chassis of FIG. 1.
Figure 5:
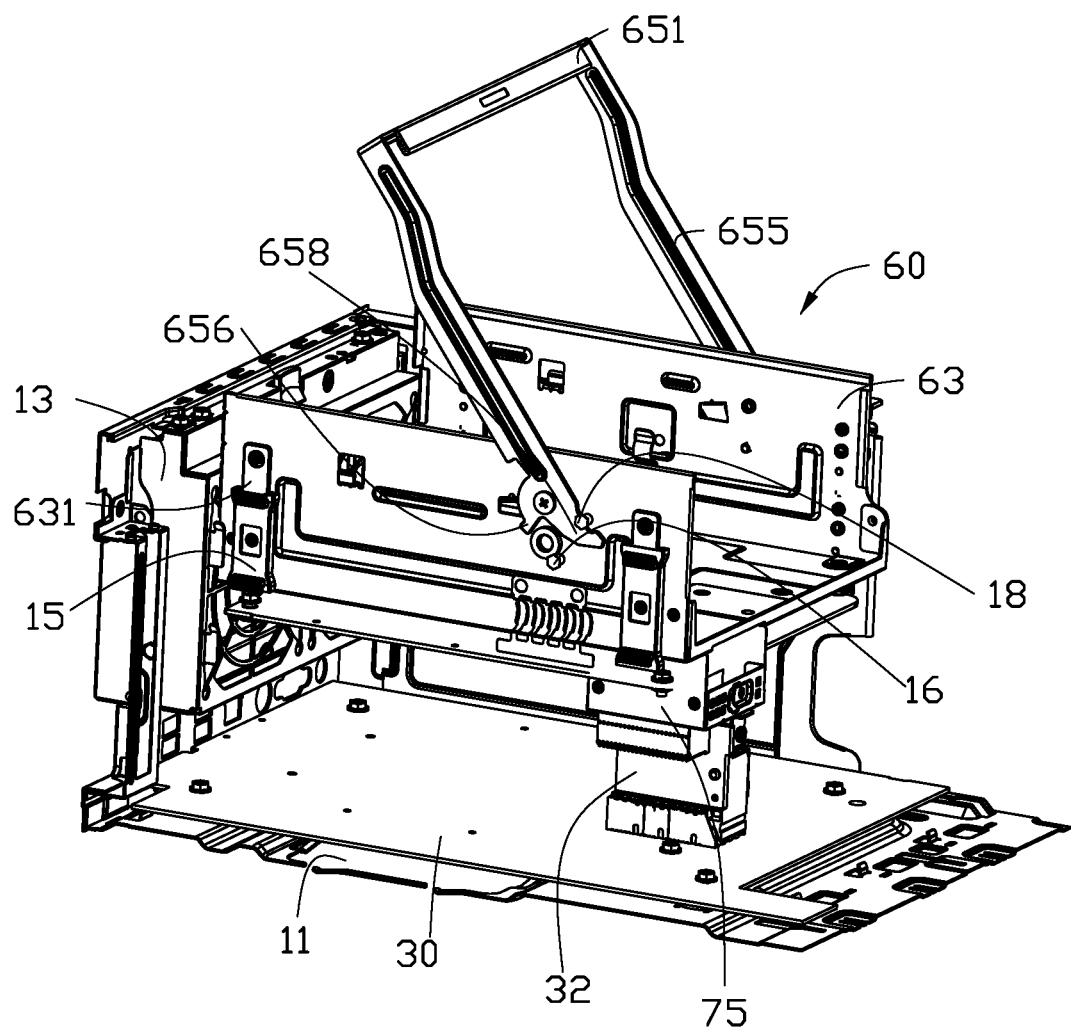
FIG. 5 is a partially assembled view of the computer chassis of FIG. 1.
Figure 6:
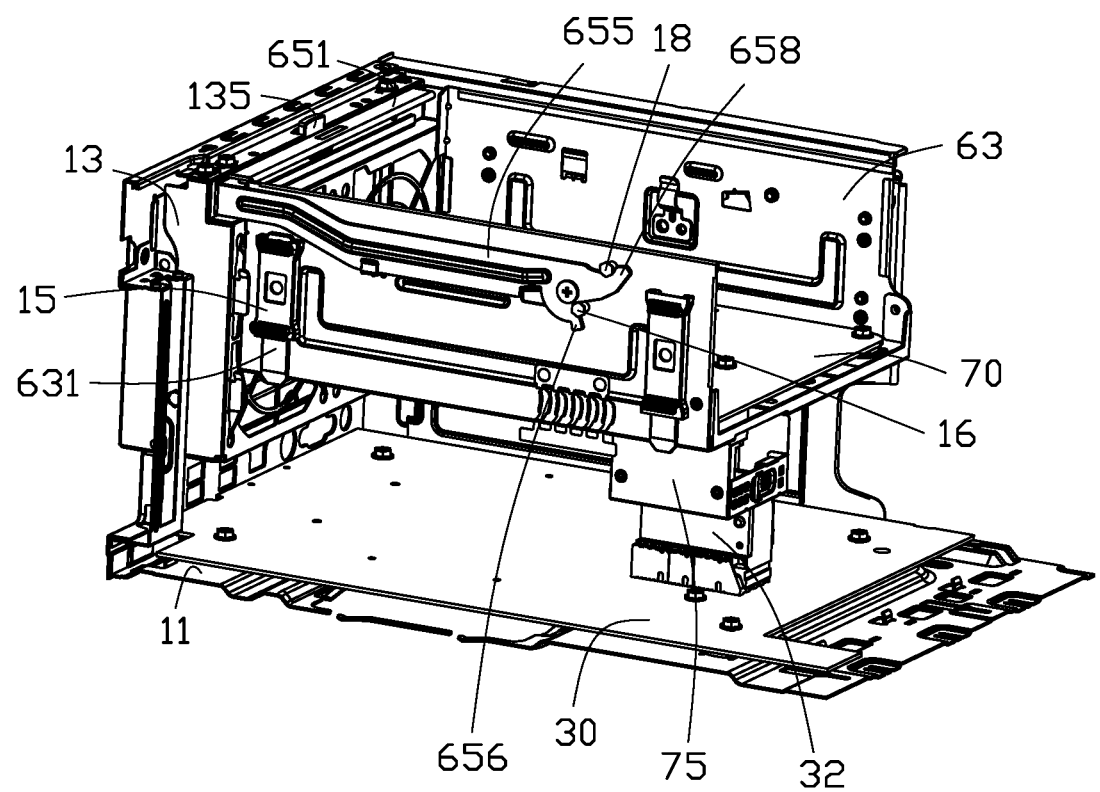
FIG. 6 is a partially assembled view of the computer chassis of FIG. 1.

FIGS. 4 to 6 illustrate that the motherboard module 50 is placed above the shell 10 and is located between the side plate 12 and the baffle 14. The guide rail 631 is inserted into the grooves of the side plate 12 and the baffle 14 and slides down along the groove 15 until the guide portion 658 abuts against the guiding column 16.

The guide portion 658 is rotated by the pressing of the guiding column 16 after the guide portion 658 is abutted against the guiding column 16, and the operation pole 651 is rotated in the direction of the bottom wall 61. The motherboard module 50 continues to slide in the direction of the bottom plate 11. The guide portion 658 contacts the pressing column 18 after being rotated by a certain angle.

The rotating arms 655 are rotated by pressing the operation pole 651 in the direction of the bottom wall 61. The guide portion 658 is pressed by the pressing column 18 so that the bracket 60 slides in the direction of the bottom plate 11.

The operation pole 651 continues to be pressed in the direction of the bottom wall 61 until both ends of the two operation pole 651 are in close contact with the two sidewalls 63. The latch member 135 is inserted into the locking hole 652 of the operation pole 651 to secure the operation pole 651, and the stopper portion 656 is pressed against the guiding column 16. At this time, the motherboard module 50 is mounted in the shell 10. The connector 75 of the second motherboard 70 is inserted into the slot 325 of the first motherboard 30, and the first motherboard 30 is electrically connected to the second motherboard 70. The computer chassis 100 is now assembled.

For removal of the motherboard module 50, the latch member 135 is pushed away from the locking hole 652, and the operation pole 651 is pulled to rotate the two rotating arms 655 so that the connector 75 is disengaged from the slot 325. Then, the motherboard module 50 can be taken out from the shell 10 by pulling the operation pole 651 away from the first motherboard 30.

The exemplary embodiments shown and described above are only examples. Many details are often found in the art such as the other features of a computer chassis. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A computer chassis, comprising:
    a shell comprising a plurality of grooves and a pressing column;
    a first motherboard received in the shell; and
    a motherboard module, the motherboard module comprising:
        a bracket comprising an operation member and a plurality of guide rails; and
        a second motherboard received in the bracket;
    wherein the plurality of guide rails is inserted into the plurality of grooves, the operation member is rotated to drive the bracket sliding to the first motherboard under the pressing column until the motherboard module is slidably installed in the shell, the second motherboard is electrical connected with the first motherboard.

2. The computer chassis of claim 1, wherein the shell comprises a bottom plate, the first motherboard is secured on the bottom plate.

3. The computer chassis of claim 2, wherein the shell further comprises a side plate connected with the bottom plate, and a rear plate connected at a rear end of the bottom plate, a baffle is connected to the rear plate and is parallel to the side plate, the plurality of grooves and the pressing column are located on the side plate and the baffle.

4. The computer chassis of claim 1, wherein the bracket comprises a bottom wall, the second motherboard is secured on the bottom wall.

5. The computer chassis of claim 4, wherein the bracket further comprises two sidewalls connected to both sides of the bottom wall, the plurality of guide rails is secured on the two sidewalls.

6. The computer chassis of claim 5, wherein the operation member comprises an operation pole and two rotating arms connected to both ends of the operation pole, the two rotating arms are respectively secured on the two sidewalls.

7. The computer chassis of claim 6, wherein the end away from the operation pole of each rotating arm comprises a guide portion, the pressing column presses the guide portion to drive the bracket sliding to the first motherboard when the rotating arms are rotated.

8. The computer chassis of claim 6, wherein the operation pole defines a locking hole, the shell comprises a latch member, the latch member is inserted into the locking hole to secure the operation pole.

9. The computer chassis of claim 1, wherein the first motherboard comprises a connecting portion, the second motherboard comprises a connector, the connector is inserted into the connecting portion and the second motherboard is electrically connected with the first motherboard.

10. A computer chassis, comprising:
    a shell comprising a plurality of grooves and a pressing column;
    a first motherboard received in the shell, comprising a connecting portion; and
    a motherboard module, the motherboard module comprising:
        a bracket comprising an operation member and a plurality of guide rails; and
        a second motherboard received in the bracket, comprising a connector;
    wherein the plurality of guide rails is inserted into the plurality of grooves, the operation member is rotated to drive the bracket sliding to the first motherboard under the pressing column, until the motherboard module is slidably installed in the shell, the connector is inserted into the connecting portion and the second motherboard is electrically connected with the first motherboard.

11. The computer chassis of claim 10, wherein the shell comprises a bottom plate, the first motherboard is secured on the bottom plate.

12. The computer chassis of claim 11, wherein the shell further comprises a side plate connected with the bottom plate, and a rear plate connected at a rear end of the bottom plate, a baffle is connected to the rear plate and is parallel to the side plate, the plurality of grooves and the pressing column are located on the side plate and the baffle.

13. The computer chassis of claim 10, wherein the bracket comprises a bottom wall, the second motherboard is secured on the bottom wall.

14. The computer chassis of claim 13, wherein the bracket further comprises two sidewalls connected to both sides of the bottom wall, the plurality of guide rails is secured on the two sidewalls.

15. The computer chassis of claim 14, wherein the operation member comprises an operation pole and two rotating arms connected to both ends of the operation pole, the two rotating arms are respectively secured on the two sidewalls.

16. The computer chassis of claim 15, wherein the end away from the operation pole of each rotating arm comprises a guide portion, the pressing column presses the guide portion to drive the bracket sliding to the first motherboard when the rotating arms are rotated.

17. The computer chassis of claim 15, wherein the operation pole defines a locking hole, the shell comprises a latch member, the latch member is inserted into the locking hole to secure the operation pole.

* * * * *